United States Patent
Tanabe

(10) Patent No.: US 8,300,514 B2
(45) Date of Patent: Oct. 30, 2012

(54) OPTICAL PICKUP DEVICE

(75) Inventor: Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/574,132

(22) Filed: Oct. 6, 2009

(65) Prior Publication Data

US 2010/0085862 A1   Apr. 8, 2010

(30) Foreign Application Priority Data

Oct. 8, 2008   (JP) ................................. 2008-261259

(51) Int. Cl.
G11B 7/00        (2006.01)
G11B 5/09        (2006.01)
G11B 7/135       (2006.01)

(52) U.S. Cl. ............. 369/112.23; 369/59.19; 369/44.21; 369/44.22; 369/112.08; 369/112.13; 369/112.2; 369/112.24; 369/112.26

(58) Field of Classification Search ............... 369/44.21, 369/44.22, 53.19, 112.08, 112.13, 112.2, 369/112.23, 112.24, 112.26
See application file for complete search history.

(56) References Cited

U.S. PATENT DOCUMENTS

| 5,818,809 | A * | 10/1998 | Arai et al. ................. 369/112.24 |
| 2002/0097504 | A1 | 7/2002 | Kitamura et al. ............. 359/719 |
| 2004/0246853 | A1 | 12/2004 | Imai ........................... 369/53.19 |
| 2006/0028935 | A1 * | 2/2006 | Mori et al. .................. 369/44.37 |
| 2007/0008836 | A1 | 1/2007 | Imagawa et al. ........... 369/44.23 |
| 2007/0104045 | A1 | 5/2007 | Nagura ....................... 369/44.23 |
| 2007/0147216 | A1 * | 6/2007 | Hirai .......................... 369/112.01 |
| 2008/0084796 | A1 | 4/2008 | Kawasaki et al. ........... 369/44.14 |
| 2008/0163278 | A1 * | 7/2008 | Wakabayashi et al. ....... 720/681 |
| 2009/0122663 | A1 * | 5/2009 | Kondo et al. ............... 369/44.32 |
| 2010/0067356 | A1 * | 3/2010 | Fujii et al. ................. 369/112.24 |

FOREIGN PATENT DOCUMENTS

| EP | 1 562 187 A2 | 8/2005 |
| EP | 1 953 747 A2 | 8/2008 |
| JP | 07-282453 A | 10/1995 |
| JP | 2003-287675 A | 10/2003 |
| JP | 2007-294023 A | 11/2007 |
| JP | 2008-186537 | 8/2008 |
| WO | WO 2006/006381 | 1/2006 |

* cited by examiner

Primary Examiner — Joseph Feild
Assistant Examiner — Aneeta Yodichkas
(74) Attorney, Agent, or Firm — Morgan, Lewis & Bockius LLP

(57) ABSTRACT

In the invention, a movable lens varying the rate of convergence or divergence of light reaching an objective lens by moving in an optical axis direction has its position adjusted to correspond to ambient temperature. The objective lens is arranged to be tilted with respect to an optical axis of light reaching the objective lens from the movable lens. First coma aberration of which the amount produced varies according to movement of the movable lens, and second coma aberration of which the amount produced varies due to variation in the warping state of an optical disc that is caused along with variation in ambient temperature both occur in the radius direction of the optical disc, and the objective lens has its tilting direction adjusted such that the first coma aberration and the second coma aberration have their increasing and decreasing directions of the amount of coma aberration produced with respect to variation in ambient temperature reversed.

8 Claims, 4 Drawing Sheets

OPTICAL PICKUP DEVICE

This application is based on Japanese Patent Application No. 2008-261259 filed on Oct. 8, 2008, the contents of which are hereby incorporated by reference.

BACKGROUND OF THE INVENTION

1. Field of the Invention

The present invention relates to an optical pickup device that is used when reading information from or writing information to an optical disc. More particularly, the invention relates to a technology suitable for an optical pickup device in which an objective lens that focuses light from a light source on an information recording surface of an optical disc is formed of resin.

2. Description of Related Art

Conventionally, reading information recorded on optical discs such as Blu-ray discs (BDs), and writing information to optical discs are performed by use of optical pickup devices. The optical pickup devices are provided with an objective lens that focuses light from a light source on an information recording surface of an optical disc. With regard to the objective lens, not a glass lens but a resin lens is conventionally used with a view to reducing the cost of the optical pickup devices (e.g., see Patent Document 1).

Resin lenses are easily affected by variation in ambient temperature; thus, if a resin lens is provided in the optical pickup devices as the objective lens, spherical aberration that occurs along with variation in ambient temperature may cause inconveniences. Note that the spherical aberration tends to cause inconveniences particularly in Blu-ray compatible optical pickup devices using a high NA objective lens.

Moreover, it has been said conventionally that the state of warping in an optical disc varies due to environmental changes (variation in temperature etc.) (e.g., see Patent Documents 2 and 3). When there is warping in the optical disc, disadvantageously, coma aberration may result in the optical pickup devices. In addition, when the warping state of the optical disc varies due to environmental changes, the amount of coma aberration produced varies; thus, the question is how to reduce the coma aberration in the optical pickup devices.

That is, in the optical pickup devices, proper reduction of aberration produced due to variation in ambient temperature is required.

Patent Document 1: JP-A-2003-287675
Patent Document 2: JP-A-7-282453
Patent Document 3: JP-A-2007-294023

SUMMARY OF THE INVENTION

An object of the present invention is therefore to provide an optical pickup device in which aberration can be properly reduced even when there is variation in ambient temperature. In particular, an object of the invention is to provide a technology suitable for an optical pickup device having, as an objective lens, a resin lens that focuses light from a light source on an information recording surface of an optical disc.

To achieve the objects described above, according to the invention, an optical pickup device comprises: a light source; an objective lens focusing light emitted from the light source on an information recording surface of an optical disc; a movable lens arranged in an optical path between the light source and the objective lens, the movable lens moving in the optical axis direction to vary the rate of convergence or divergence for light reaching the objective lens; lens-position adjusting means for adjusting the position of the movable lens; and temperature monitoring means for monitoring ambient temperature. In the optical pickup device according to the invention, the lens-position adjusting means adjust the position of the movable lens to correspond to the ambient temperature; the objective lens is arranged to be tilted with respect to an optical axis of light reaching the objective lens from the movable lens; a first coma aberration of which the amount produced varies according to movement of the movable lens, and a second coma aberration of which the amount produced varies due to variation in the warping state of the optical disc that is caused along with variation in the ambient temperature both occur in the radius direction of the optical disc; and the tilting direction of the objective lens is adjusted such that the first coma aberration and the second coma aberration have their increasing and decreasing directions of the amount of coma aberration produced with respect to the ambient temperature reversed.

With this structure, the movable lens is moved to correspond to variation in ambient temperature. Thus, it can be said that the first coma aberration, of which the amount produced varies according to movement of the movable lens, has its amount produced due to the variation in ambient temperature. Incidentally, the first and the second coma aberration of which the amount produced varies due to the variation in ambient temperature both occur in the radius direction, but the increasing and decreasing directions of the amount produced with respect to the ambient temperature is reversed. It is therefore possible to achieve a structure in which the first coma aberration and the second coma aberration almost cancel each other over in the entire or almost entire range of ambient temperature for usage, and thereby keep the coma aberration, which is obtained by adding the first and the second coma aberration, at a lower level. Moreover, since the structure allows the movable lens that varies the rate of convergence or divergence for light incident on the objective lens to be moved to correspond to variation in ambient temperature, it is possible to properly reduce spherical aberration that occurs along with the variation in ambient temperature. That is, with this structure, it is possible to properly reduce spherical aberration and coma aberration that occur due to variation in ambient temperature.

In the optical pickup device with the above-described structure, it is preferable that tilting of the objective lens be adjusted such that the amount of the third coma aberration produced, which is obtained by adding the first and the second coma aberration, does not exceed a predetermined permissible value. The predetermined permissible value may be determined such that the information-reading quality (the playback quality) in the optical pickup device is maintained within an acceptable range. In this way, the optical pickup device with this structure can perform stable playback even when there is variation in ambient temperature.

The optical pickup device with the above-described structure is structured suitable for a case where the objective lens is a resin lens. With resin lenses, disadvantageously, spherical aberration may result due to variation in ambient temperature. As described above, however, in the optical pickup device with this structure, such spherical aberration can be corrected properly.

In the optical pickup device with the above-described structure, it is preferable that the movable lens be a collimated lens. As means for adjusting the rate of convergence or divergence for light reaching the objective lens to correct spherical aberration, there are ways including where a beam expander is used. The beam expander is generally provided with at least one movable lens. Thus, it is also possible to use a movable lens provided in the beam expander as the movable lens according to the invention. However, as in this structure, it is preferable that the objective lens be a collimator lens, because the number of components of an optical system provided in the optical pickup device can be reduced thereby.

According to the present invention, it is possible to provide an optical pickup device in which aberration can be properly reduced even when there is variation in ambient temperature. The invention is suitable for an optical pickup device in which a resin lens, which is easily affected by variation in ambient temperature, is used as an objective lens that focuses light from a light source on an information recording surface of an optical disc.

DETAILED DESCRIPTION OF PREFERRED EMBODIMENTS

Hereinafter, a description will be given of an optical pickup device according to an embodiment of the present invention with reference to the accompanying drawings.

Figure 1:
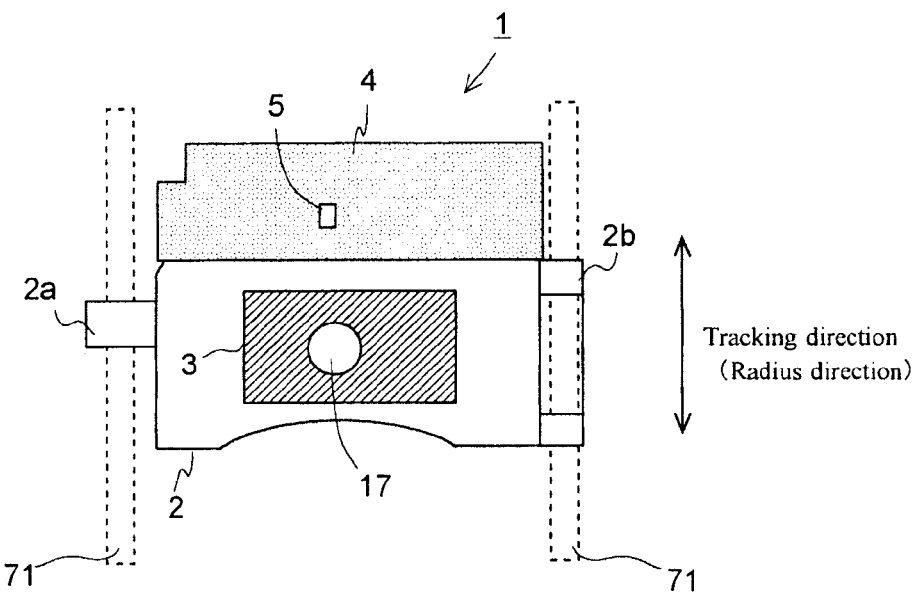
FIG. 1 is a plan view schematically showing the structure of an optical pickup device according to an embodiment of the present invention.
Figure 2:
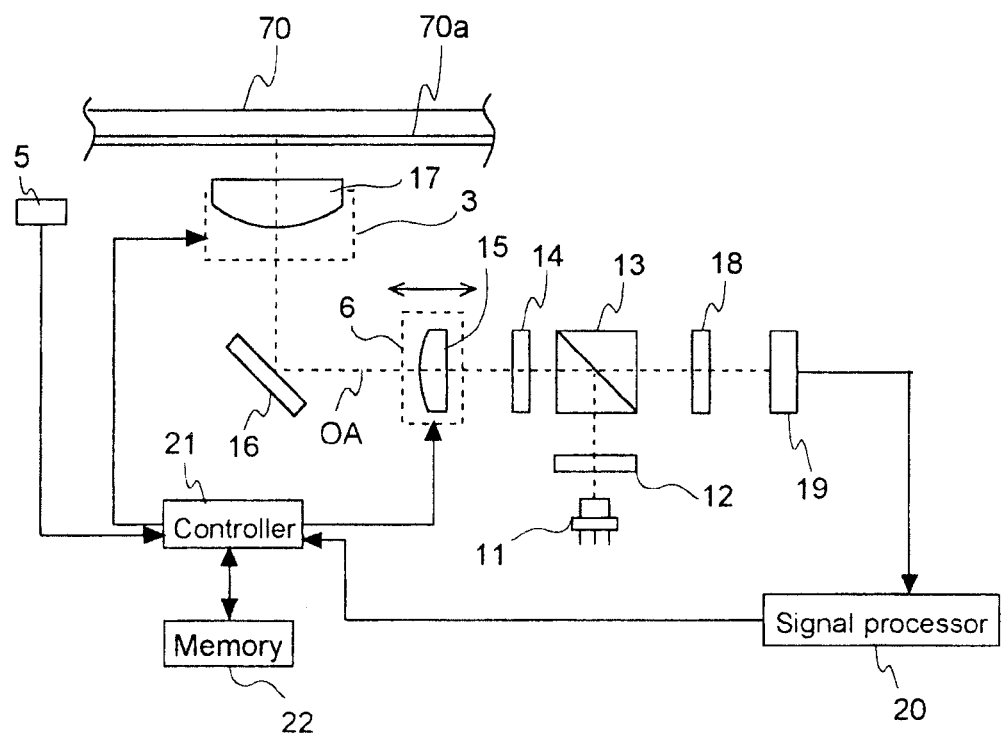
FIG. 2 is a schematic view illustrating the structure of an optical system provided in the optical pickup device according to the embodiment.
Figure 3:
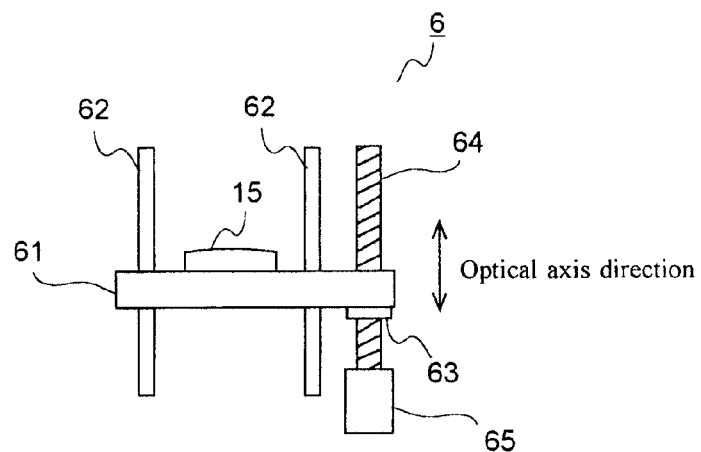
FIG. 3 is a plan view schematically showing the structure of a collimator-lens positioning mechanism provided in the optical pickup device according to the embodiment.
Figure 4A:
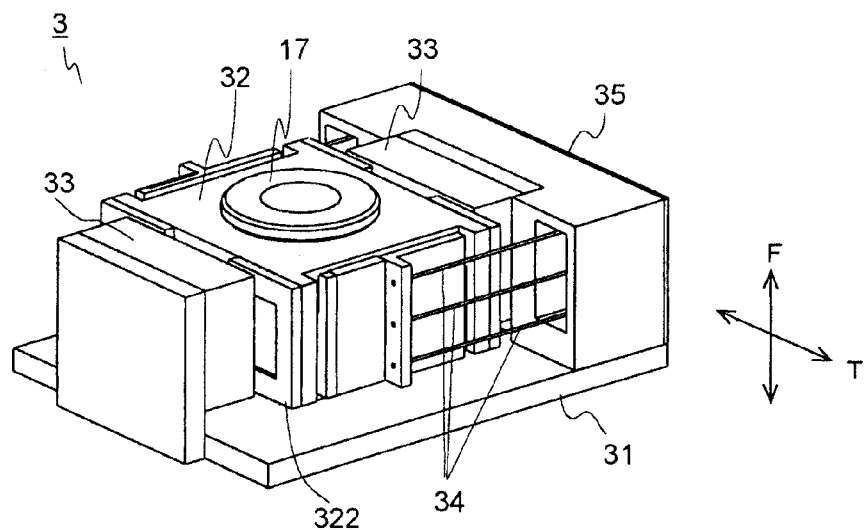
FIG. 4A is a perspective view schematically showing the overall structure of an objective lens actuator provided in the optical pickup device according to the embodiment.
Figure 4B:
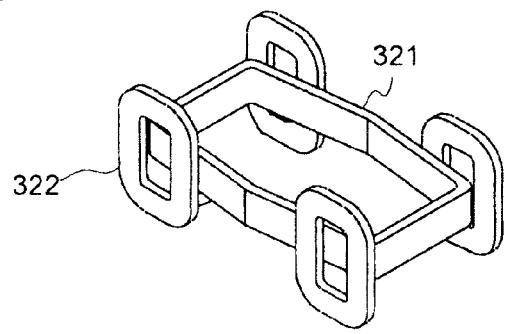
FIG. 4B is a perspective view schematically showing the structure of a coil provided in the objective lens actuator according to the embodiment.

First, with reference to FIGS. 1 to 3, 4A and 4B, an outline of the structure of the optical pickup device according to the embodiment will be described. FIG. 1 is a plan view schematically showing the structure of the optical pickup device according to the embodiment. FIG. 2 is a schematic view illustrating the structure of an optical system provided in the optical pickup device according to the embodiment. FIG. 3 is a plan view schematically showing the structure of a collimator-lens positioning mechanism provided in the optical pickup device according to the embodiment. FIG. 4A is a perspective view schematically showing the overall structure of an objective lens actuator provided in the optical pickup device according to the embodiment; FIG. 4B is a perspective view schematically showing the structure of a coil provided in the objective lens actuator according to the embodiment.

As shown in FIG. 1, the optical pickup device 1 according to the embodiment is provided with a slider base 2. The slider base 2 has two axis supporting portions 2a and 2b of different kinds. The slider base 2 is slidably supported, with the axis supporting portions 2a and 2b, on two guide shafts 71 that extend in a radius direction of an optical disc (unillustrated). This makes the optical pickup device 1 movable in the radius direction. The slider base 2 is moved by an unillustrated moving mechanism that is publicly known. Such a publicly known moving mechanism includes a structure in which a rack mounted on the slider base 2 and a pinion rotated by a motor are used.

On the slider base 2, an optical system as shown in FIG. 2 is mounted. That is, on the slider base 2, there are mounted a light source 11, a diffraction element 12, a polarizing beam splitter 13, a ¼ wavelength plate 14, a collimator lens 15, a deflecting mirror 16, an objective lens 17, a cylindrical lens 18, and a photodetector 19. The objective lens 17 is mounted on the slider base 2 with its being mounted on the objective lens actuator 3.

The light source 11 comprises a semiconductor laser and, since the optical pickup device 1 is compatible with BDs, emits a laser beam having a wavelength of 405 nm. The diffraction element 12 separates a laser beam emitted from the light source 11 into a principal ray and two secondary rays. The reason that the light from the light source 11 is separated into three different rays is that signals necessary for performing servo control are obtained.

The polarizing beam splitter 13, working together with the ¼ wavelength plate 14, serves as an optical isolator. Specifically, the polarizing beam splitter 13 reflects a laser beam from the light source 11 and thereby guides it toward the optical disc 70, and permits return light reflected by the optical disc 70 to pass therethrough and thereby guides it toward the photodetector 19.

The collimator lens 15 is a lens, when placed at an appropriate position, capable of converting an incoming laser beam into a parallel light beam. Note that in the optical pickup device 1, the collimator lens 15 is made movable in the optical axis direction (direction indicated by a left and right arrowed line in FIG. 2). For this reason, the laser beam emitted from the light source 11 and then passing through the collimator lens 15 is not always a parallel light beam, but may be a converged light beam or a diverged light beam. The reason that the position of the collimator lens 15 is made adjustable as described above is that the rate of convergence or divergence for a laser beam incident on the objective lens 17 is adjusted by moving the collimator lens 15, and that spherical aberration is reduced thereby. Note that the collimator lens 15 is an embodiment of a movable lens according to the present invention.

As means for adjusting the position of the collimator lens 15, there is no particular restriction on the structure so long as it can adjust the position of the collimator lens 15 in the optical axis direction. For example, it is possible to adjust the position of the collimator lens 15 by use of a collimator-lens-position adjusting mechanism 6 as shown in FIG. 3. The collimator-lens-position adjusting mechanism 6 is arranged on the slider base 6. In addition, the collimator-lens-position adjusting mechanism 6 is an embodiment of lens-position adjusting means according to the invention.

As shown in FIG. 3, the collimator-lens-position adjusting mechanism 6 comprises: a movable holder 61 movably provided and holding the collimated lens 15; two guide shafts 62 serving as a guide such that the movable holder 61 moves in the optical axis direction; a lead screw 64 meshing with a lead nut 63 fitted to the movable holder 61; and a stepping motor 65 rotating the lead screw 64. Although unillustrated, a photointerrupter is provided so as to determine the reference position. With this structure, it is possible to move the collimator lens 15 together with the movable holder 61 in the optical axis direction by rotating the lead screw 64 by the stepping motor 65. The position of the collimator lens 15 can be adjusted according to the number of steps of the stepping motor 65.

Back to FIG. 2, the deflecting mirror 16 reflects a laser beam transmitted through the collimator lens 15. Thus, a laser beam emitted from the light source 11 has its advancing direction bent, and then further advances in a direction perpendicular to an information recording surface 70a of the optical disc 70.

The objective lens 17 focuses the laser beam, which is transmitted from the deflecting mirror 16, on the information recording surface 70a of the optical disc 70. As mentioned above, the objective lens 17 is mounted on the objective lens actuator 3. By the objective lens actuator 3, the objective lens 17 is made movable in directions close to and away from the optical disc 70 (up and down directions in FIG. 2), namely in a focusing direction, and in a direction parallel to the radius direction of the optical disc 70 (transverse direction on the paper of FIG. 2), namely in a tracking direction.

A structure of the objective lens actuator 3 incorporated in the optical pickup device 1 will be described with reference to FIGS. 4A and 4B. The objective lens actuator 3 comprises an act base 31 and a lens holder 32 holding the objective lens 17. On the act base 31, a pair of permanent magnets 33 are placed upright so as to be arranged symmetrically with the lens holder 32 in between.

The lens holder 32 has one ends of wires 34 fixed at its sides, three wires 34 at one side and totally six wires 34 at both sides. The other ends of the wires 34 are fixed to a circuit board 35 placed upright on the act base 31. This allows the lens holder 32 to be supported swingably by the wires 34.

Moreover, the lens holder 32 has: a focusing coil 321 arranged along inner side walls of the lens holder 32 so as to surround an optical axis of the objective lens 17; and four tracking coils 322 arranged symmetrically at positions on outer side walls (side walls facing the permanent magnets 33) of the lens holder 32, two tracking coils 322 at each side wall. These coils 321 and 322 are so made as to be fed with electric current via the wires 34.

When the focusing coil 321 is fed with electric current, electromagnetic effect is caused by a magnetic field formed by the permanent magnets 33 and an electric current passing through the focusing coil 321, and the objective lens 17 is moved together with the lens holder 32 in the focusing direction F according to the direction and the magnitude of the electric current passing through the coil 321. Likewise, when the tracking coils 322 are fed with electric current, the objective lens 17 is moved together with the lens holder 32 in the tracking direction T according to the direction and the magnitude of the electric current.

Back to FIG. 2, the return light reflected by the information recording surface 70a is made to pass through the objective lens 17, the deflecting mirror 16, the collimator lens 15, the ¼ wavelength plate 14, and the polarizing beam splitter 13 in this order, and then reaches the cylindrical lens 18. A laser beam incident on the cylindrical lens 18 is provided with astigmatic aberration. The reason that the astigmatic aberration is provided by the cylindrical lens 18 is that a signal necessary for performing the servo control is obtained.

The laser beam provided with astigmatic aberration by the cylindrical lens 18 is focused on a light-receiving region of the photodetector 19. The photodetector 19 converts an optical signal received at the light-receiving region into an electrical signal and outputs it. Then, processing is performed on electrical signals outputted from the photodetector 19 in a signal processor 20, whereby, for example, a playback signal, a focus error signal, a tracking error signal, and the like are produced.

A controller 21 receives the focus error signal and the tracking error signal from the signal processor 20 and, based on these signals, controls the objective lens actuator 3, so that servo control, including focus control and tracking control, is performed. Here, the focus control denotes control performed such that the focal position of the objective lens 17 always matches with the information recording surface 70a. In addition, the tracking control denotes control performed such that the light spot formed by focusing the light incident on the objective lens 17 is at all times made to follow a track formed on the optical disc 70.

Moreover, the controller 21 adjusts, based on the ambient temperature information from a thermistor 5 (see FIG. 1), the position of the collimator lens 15 by use of the collimator-lens-position adjusting mechanism 6. In the optical pickup device 1 according to the embodiment, a resin lens is used as the objective lens 17. Thus, it is necessary to correct spherical aberration produced along with variation in ambient temperature. For this reason, the thermistor 5 monitors temperature and, based on the monitored temperature, the position of the collimator lens 15 is adjusted so as to correct the spherical aberration. Information related to the collimator lens position at which spherical aberration can be properly corrected at different ambient temperatures is stored in a memory 22. Thus, by use of the information stored in the memory 22, the controller 21 determines the proper position for the collimator lens 15 at the monitored ambient temperature, and controls the collimator-lens-position adjusting mechanism 6 so that the collimator lens 15 is in that proper position.

The thermistor 5, which is provided for monitoring the ambient temperature of the optical pickup device 1, is mounted on the printed circuit board 4 (see FIG. 1) that is arranged on the slider base 2. Although the thermistor 5 is an embodiment of temperature monitoring means according to the present invention, the temperature monitoring means according to the invention is not limited to a thermistor; for example, a thermocouple etc. can be used instead as necessary. In addition, it is preferable that the temperature monitoring means according to the invention be made to monitor the ambient temperature near the objective lens 17; thus, the position of the temperature monitoring means is not limited to that according the embodiment, and it may be altered as necessary.

The optical pickup device 1 according to the embodiment is configured as outlined above; in being able to properly correct aberration even when there is variation in ambient temperature, the optical pickup device 1 has a distinctive feature. This will be described below. Prior to the description, the meanings of the terms used hereinafter will be clarified with reference to FIG. 5.

Figure 5:
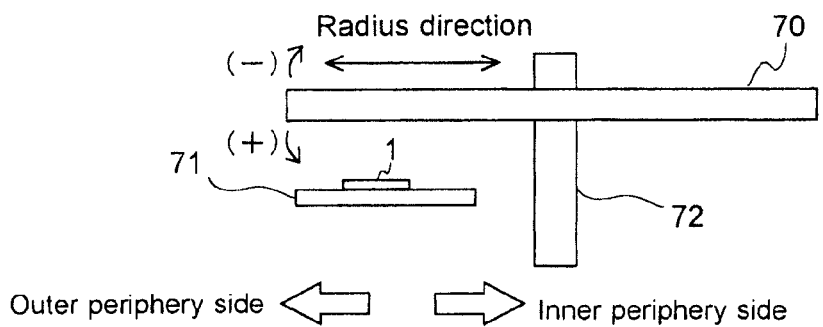
FIG. 5 is a schematic view showing the optical pickup device according to the embodiment and members that are arranged around it.

The warping in the optical disc 70 is represented as follows. As shown in FIG. 5, with a state where there is no warping serving as a reference, it is represented by plus (+) when the optical disc 70 is warped toward the optical pickup device 1 (its lower side), and by minus (−) when warped toward where there is no optical pickup device 1 (its upper side). In addition, as shown in FIG. 5, suppose the optical pickup device 1 is located at the left of a motor shaft 72 of a spindle motor (unillustrated) that rotates the optical disc 70, the inner periphery side and the outer periphery side of the optical disc 70 are determined as shown in FIG. 5.

As described above, since a resin lens is used as the objective lens 17 in the optical pickup device 1, disadvantageously, spherical aberration may result when there is variation in the ambient temperature. In terms of the spherical aberration, it is corrected as described above by moving the collimator lens 15 to a position to correspond to the variation in the ambient temperature.

Spherical aberration can be properly corrected, even when there is variation in the ambient temperature, by adjusting the position of the collimator lens 15; however, there also occurs coma aberration, and this needs to be reduced as well. The coma aberration, which may cause inconveniences in the optical pickup device 1, will be described below.

Figure 6:
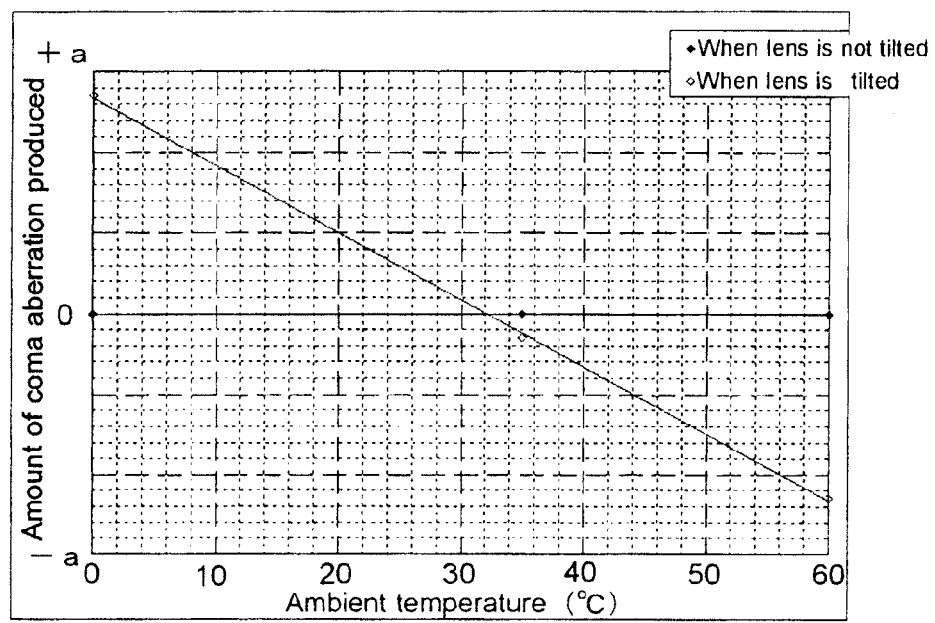
FIG. 6 is a diagram for illustrating coma aberration that is produced ascribable to the structure of the optical pickup device according to the embodiment, and is a graph showing the relationship between ambient temperature and the amount of coma aberration produced.

FIG. 6 is a diagram for illustrating coma aberration that is produced ascribable to the structure of the optical pickup device 1 according to the embodiment, and is a graph showing the relationship between ambient temperature and the amount of coma aberration produced. FIG. 6 shows the amount of coma aberration produced in a state where the collimator lens 15 is arranged at an optimum position at which spherical aberration produced due to variation in ambient temperature is properly corrected.

In FIG. 6, cases are shown where the objective lens 17 is tilted or not tilted with respect to an optical axis OA (see FIG. 2) of a laser beam from the collimator lens 15 reaching the objective lens 17. In the case where the objective lens 17 is tilted, the objective lens 17 tilts in the radius direction, and in addition tilts towards the inner periphery side of the optical disc 70 (hereinafter, this direction will be simply referred to as the inner periphery side in the radius direction).

As seen from FIG. 6, when the objective lens 17 is tilted, the amount of coma aberration produced varies with respect to variation in ambient temperature at an approximately constant inclination. This is because the position of the collimator lens 15 is changed, while the objective lens 17 being tilted, so as to correspond to the variation in ambient temperature. In such a case as shown in FIG. 6, the amount of coma aberration produced is large particularly when the temperature is high or low. For this reason, coma aberration needs to be corrected so as not to affect the information-reading quality (the playback quality) of the optical pickup device 1.

Figure 7:
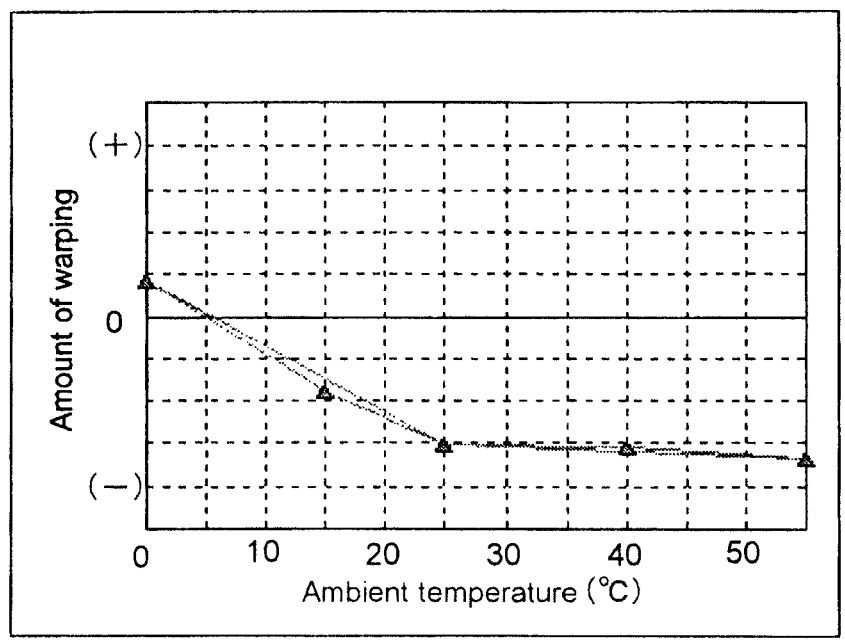
FIG. 7 is a graph showing the relationship between ambient temperature and the amount of warping in commercially distributed Blu-ray discs.

FIG. 7 is a graph showing the relationship between ambient temperature and the amount of warping in commercially distributed Blu-ray discs (BDs). As shown in FIG. 7, when the ambient temperature varies, the amount of warping in the optical disc 70 varies. To be specific, at below 25° C. in particular, as the ambient temperature decreases, the amount of warping in the minus direction decreases, and at 0° C., warping occurs in the plus direction. When reading etc. information from such an optical disc 70 by use of the optical pickup device, the playback quality of the optical pickup device 1 is highly likely to be degraded because of coma aberration of which the amount produced varies according to variation in the state of warping in the optical disc 70, which occurs along with the variation in the ambient temperature. Accordingly, this coma aberration needs to be corrected as well.

FIG. 7 shows the results of examining two commercially distributed BDs of different kinds on variation in the amount of warping with respect to ambient temperature. There is no significant difference in the two different BDs in terms of the variation in the amount of warping with respect to the ambient temperature.

Here, with respect to coma aberration (hereinafter referred to as the first coma aberration) of which the amount produced varies according to the movement of the collimator lens 15 shown in FIG. 6, the increasing and decreasing directions of the amount of coma aberration produced with respect to the ambient temperature can be varied according to the tilting direction of the objective lens 17. To be specific, by making the objective lens 17 tilt toward the inner periphery side or outer periphery side in the radius direction, it is possible to reverse the increasing and decreasing directions of the amount of coma aberration produced with respect to the variation in the ambient temperature. Moreover, according to the amount of the objective lens 17 tilted, it is possible to adjust the amount of coma aberration produced.

Note that coma aberration (hereinafter referred to as the second coma aberration), of which the amount produced varies due to variation in the warping state of the optical disc 70 that is caused along with variation in the ambient temperature (see FIG. 7), occurs in the radius direction. Thus, by tilting the objective lens 17 in the radius direction and determining the tilting direction of the objective lens 17 such that the first coma aberration and the second coma aberration have their increasing and decreasing directions of the amount of coma aberration produced with respect to the ambient temperature reversed, it is possible to achieve the following effect. That is, in this way, it is possible to almost cancel the second coma aberration with the first coma aberration over the entire or almost entire range of the ambient temperature for usage.

Note that the expression "almost entire region" is to consider that there may be a case where the first coma aberration and the second coma aberration is not in a relationship where they cancel each other. In addition, the expression "almost cancels" is to consider that there may be a case where the second coma aberration is not canceled with the first coma aberration completely.

More specifically, first, the tilting direction of the objective lens 17 is determined such that the first coma aberration and the second coma aberration have their increasing and decreasing directions of the amount of coma aberration produced with respect to the ambient temperature reversed. Then, tilting of the objective lens 17 is adjusted such that the first coma aberration and the second coma aberration almost cancel each other over a range, as wide as possible (preferably, the entire range), of the ambient temperature for usage. The tilting is adjusted, for example, by tilting the objective lens actuator 3 that holds the objective lens 17.

Here, at any temperature within the range of ambient temperature for usage, a third coma aberration which is obtained by adding the first coma aberration and the second coma aberration is made not to exceed a predetermined permissible value. This is to consider the cases as described above where the first coma aberration and the second coma aberration does not cancel each other completely even when they are in a relationship where they cancel each other, and where the first coma aberration and the second coma aberration is not in a relationship where they cancel each other in the first place. When the third coma aberration obtained by adding the first coma aberration and the second coma aberration is too large, the playback quality of the optical pickup device 1 degrades.

For this reason, the predetermined permissible value is determined such that the playback quality of the optical pickup device 1 is within an acceptable range. Note that predetermined permissible values are determined according to the structure of optical pickup devices, and are set as necessary during their manufacturing. For example, when an optical pickup device 1 has tilting means for tilting the objective lens 17 and thereby can correct coma aberration, it is possible to make the predetermined permissible value large.

Figure 8:
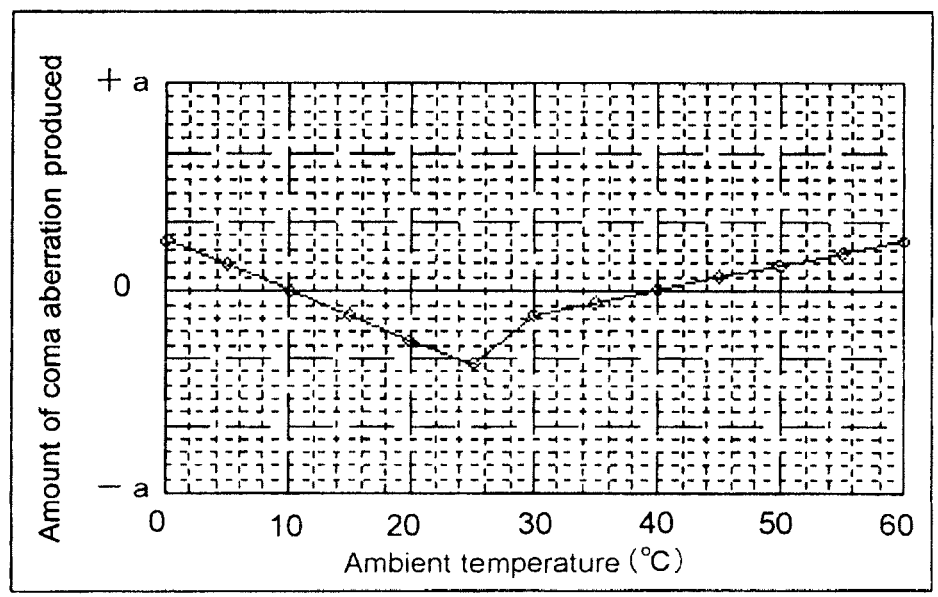
FIG. 8 is a graph showing the relationship between ambient temperature and the amount of coma aberration produced during play back of the optical disc 70 having a characteristic shown in FIG. 7, by use of the optical pickup device according to the embodiment.

FIG. 8 is a graph showing the relationship between ambient temperature and the amount of coma aberration produced during play back of the optical disc 70 (with a characteristic shown in FIG. 7) in the optical pickup device 1 in which tilting of the objective lens 17 is adjusted as described above. In FIG. 8, the amount of coma aberration produced at higher temperature and at lower temperature is decreased compared with the case in FIG. 6, which shows that the amount of coma aberration produced at any ambient temperature is corrected so that it is kept at a lower level. That is, in the optical pickup device 1 according to the embodiment, aberration is properly corrected even when there is variation in ambient temperature.

It should be understood that the embodiment described above is merely an example, and is therefore not meant to limit in any way the manner in which the present invention can be carried out. That is, many modifications and variations are possible within the scope and spirit of the present invention.

For example, in the above-described embodiment, a structure is shown in which a collimator lens is used as the movable lens according to the invention; however, it should be understood that the invention may be practiced with any other structure. For example, a beam expander may be used for correcting spherical aberration produced with respect to variation in ambient temperature, and the movable lens according to the invention may be a movable lens provided in the beam expander.

The present invention can be applied suitably to optical pickup devices in which BDs are targeted for information reading and writing, and, needless to say, the invention can be applied to optical pickup devices compatible with optical discs of other kinds.

The present invention can be applied suitably to optical pickup devices in which a resin lens is used as the objective lens that focuses light from a light source on an information recording surface of an optical disc.

What is claimed is:

1. An optical pickup device comprising:
   a light source;
   an objective lens focusing light emitted from the light source on an information recording surface of an optical disc;
   a movable lens arranged in an optical path between the light source and the objective lens, the movable lens moving in an optical axis direction to vary a rate of convergence or divergence for light reaching the objective lens;
   lens-position adjusting means for adjusting a position of the movable lens; and
   temperature monitoring means for monitoring ambient temperature, wherein
   the lens-position adjusting means is adapted to adjust the position of the movable lens to correspond to the ambient temperature,
   the objective lens is arranged to be tilted with respect to an optical axis of light reaching the objective lens from the movable lens, wherein
   a first coma aberration be in a coma aberration of which produced varies according to movement of the movable lens due to the objective lens being tilted, and a second coma aberration be in a coma aberration of which an amount produced varies due to variation in a warping state of the optical disc that is caused along with variation in the ambient temperature, and
   a tilting direction of the objective lens is adjusted such that the first coma aberration occurs in a radius direction of the optical disc and such that amounts of the first coma aberration and the second coma aberration produced increase or decrease in opposite directions with respect to the ambient temperature.

2. The optical pickup device according to claim 1, wherein the tilting of the objective lens is adjusted such that, over an entire or substantially entire range of ambient temperature for usage, the first coma aberration and the second coma aberration substantially cancel each other.

3. The optical pickup device according to claim 1, wherein the objective lens is a resin lens.

4. The optical pickup device according to claim 1, wherein the movable lens is a collimator lens.

5. The optical pickup device according to claim 2, wherein the objective lens is a resin lens.

6. The optical pickup device according to claim 2, wherein the movable lens is a collimator lens.

7. The optical pickup device according to claim 3, wherein the movable lens is a collimator lens.

8. The optical pickup device according to claim 5, wherein the movable lens is a collimator lens.

* * * * *